United States Patent [19]

Amelio et al.

[11] 3,796,932

[45] Mar. 12, 1974

[54] CHARGE COUPLED DEVICES EMPLOYING NONUNIFORM CONCENTRATIONS OF IMMOBILE CHARGE ALONG THE INFORMATION CHANNEL

[75] Inventors: Gilbert Frank Amelio, Basking Ridge; Robert Harold Krambeck, South Plainfield; Kenneth Arnold Pickar, Westfield, all of N.J.

[73] Assignee: Bell Telephone Laboratories, Incorporated, Murray Hill, N.J.

[22] Filed: June 28, 1971

[21] Appl. No.: 157,507

[52] U.S. Cl. ... 317/235 R, 317/235 G, 317/235 AY, 307/304

[51] Int. Cl. ........ H01l 11/14

[58] Field of Search ........ 317/235 B, 234 UA; 307/304, 221 C

[56] References Cited

UNITED STATES PATENTS

| | | | |
|---|---|---|---|
| 3,697,786 | 10/1972 | Smith | 317/235 |
| 3,621,283 | 11/1971 | Teer | 317/235 |
| 3,651,349 | 3/1972 | Kahng et al | 317/235 |
| 3,654,499 | 4/1972 | Smith | 317/235 |
| 3,656,011 | 4/1972 | Weinberg | 317/235 |

FOREIGN PATENTS OR APPLICATIONS

| | | | |
|---|---|---|---|
| 1,153,428 | 5/1969 | Great Britain | 317/235 |

*Primary Examiner*—Jerry D. Craig
*Attorney, Agent, or Firm*—G. W. Houseweart; P. V. D. Wilde

[57] ABSTRACT

In Charge Coupled Apparatus laterally graded distributions of immobile charge are disposed under the electrodes and, optionally, between the electrodes to enhance the desired unidirectionality of charge transfer and, optionally, to enable the gap regions between electrodes to act as active storage sites in the information channel. A graded distribution of immobile charge under an electrode provides a built-in electric field in the desired direction of charge propagation so that field-enhanced charge transfer, and concomitant improved speed, is effected. A graded distribution of immobile charge in a gap between electrodes provides a built-in, suitably asymmetric potential well in the gap. This built-in potential well in the gap can be used as a temporary storage site for charge carriers (much like any other potential well in a CCD) to enable one-phase operation and more compact devices.

29 Claims, 15 Drawing Figures

INVENTORS: G. F. AMELIO
R. H. KRAMBECK
K. A. PICKAR
BY Arthur J. Torsiglieri
ATTORNEY

CHARGE COUPLED DEVICES EMPLOYING NONUNIFORM CONCENTRATIONS OF IMMOBILE CHARGE ALONG THE INFORMATION CHANNEL

BACKGROUND OF THE INVENTION

This invention relates to charge coupled devices (CCD's) in which nonuniform amounts of immobile charge are disposed along the information channel to enhance the unidirectionality of charge transfer and, optionally, to enable one-phase operation and more compact devices.

Charge coupled devices are a new class of devices adapted for storing and sequentially transferring electronic signals representing information in the form of packets of mobile charge carriers localized in artificially induced potential energy minima in suitable storage media, such as semiconductors, semi-insulating semiconductors, and insulators. In the simplest form of such devices the electric field which causes lateral transfer of mobile charge from one potential energy minimum to the next is due to the mutual repulsion of like carriers, i.e., the force driving carriers is analogous to the well-known process of diffusion which, in general in physical systems causes free particles of like kind to move from areas of greater concentration to areas of lesser concentration.

Accordingly, it will be appreciated that this diffusion current decreases exponentially as the transfer of a packet of carriers progresses and, as a result, is quite small near the end of the transfer. This fact is known to cause serious limitations on high-frequency performance of certain conventional charge coupled devices and additionally is known to contribute significantly to the problem of incomplete charge transfer in such devices.

It has also been recognized heretofore that the lateral distance of charge transfer also is limiting factor on speed and signal integrity and for this reason, and for economic reasons, it is desirable to provide more compact devices within any given set of practical manufacturing design tolerances. Conventional charge coupled devices have required at least two, and often three or four, electrodes per unit of stored information and, as such, have been unnecessarily large in physical dimensions.

An additional consideration providing a motivating force leading to the instant invention is that topologic design considerations dictate that the number of driving phases required to effect charge transfer in charge coupled devices advantageously are minimized.

SUMMARY OF THE INVENTION

In view of the above-described and other operational and fabricational difficulties, it is an object of this invention to provide charge coupled devices having built-in electric fields of polarity and magnitude sufficient to cause field-enhanced charge transfer to improve speed and completeness of charge transfer in charge coupled devices.

It is a further object of this invention to reduce the number of phases and, concomitantly, the number of conduction paths required per information channel to effect charge transfer in charge coupled devices.

Related but distinct from the object set forth in the paragraph immediately above, it is another object of this invention to provide a means for utilizing the interelectrode spaces in charge coupled devices as active members in the transfer mechanism in the information channel such that significantly more compact charge coupled devices can be realized for any given practical manufacturing tolerances.

To these and other ends, a CCD structure in accordance with a first embodiment of the instant invention includes a graded distribution of immobile charge disposed under the electrodes along the information channel. This graded distribution of immobile charge may be provided in the form of ionized charge disposed in the insulator which separates the electrodes from the storage medium, or, alternatively, and as presently preferred, may be provided by a suitably graded density of dopant impurities in a semiconductive storage medium.

In operation the surface potential of the storage medium is affected by immobile charge adjacent to the surface of the storage medium in an amount nearly linearly proportional to the amount of charge at any given point. As a result, a linear grading of dopant impurities produces a nearly linear gradient in surface potential underneath the electrodes when a voltage is applied to the electrodes. This linear surface potential gradient, of course, produces an electric field-enhanced charge transfer in the desired direction of propagation. This field-enhanced charge transfer is, of course, most significant near the end of a given charge transfer when the diffusion force has substantially dissipated.

In another class of charge coupled devices in accordance with the instant invention, reliance has been placed upon an analysis that in any charge coupled device there must exist the following three basic features. First, if the storage medium is semiconductive there must exist a means for reducing the majority carrier density in the information channel to a sufficient extent that minority carriers (which are used to represent signal information) may exist there in reasonable quantity and with relatively very long lifetimes. Second, there must exist some means for providing an electric field, i.e., an asymmetry, associated with each storage site; and this electric field must be in such a direction that predictable unidirectionality of charge transfer in the desired direction is ensured. And, finally, there must exist at all times during the operation at least as many local potential energy minima as there are units of information in the device so that the integrity of the information is maintained.

Having analyzed the foregoing three basic criteria, one form of this invention is based on the recognition that nothing in the criteria requires that the successive local potential energy minima must appear under electrodes, as they have been made to occur in conventional charge coupled devices heretofore. More specifically, it is based on the recognition that it should be possible to use the space between successive electrodes as an active member in the transfer and storage process, provided such interelectrode spaces can be made to conform to the three basic criteria set forth above.

Pursuant to the above-described recognition, the generic inventive concept which inheres in the successive embodiments of this form of the invention is that locally nonuniform, and preferably graded, distributions of immobile charge are disposed either in the dielectric or in the storage medium along the information channel in sufficient quantity and polarity so as to cause the surface potential under the interelectrode spaces to approximately assume the same or similar configuration, i.e., the same or similar asymmetry, as does the surface potential under the electrodes, a condition which will be referred to hereinafter as "mutual asymmetry." One this feature is established it then follows that the magnitude of the surface potential under the electrodes can be made to vary above and below that of the surface potential under the interelectrode spaces such that charge can respectively be drawn into the potential wells under the interelectrode spaces and thereafter drawn from such potential wells into an even deeper potential well under the successive electrode. It of course follows directly that, if the portions of storage medium under the interelectrode spaces as well as the portions of the storage medium under the electrodes can be used as storage sites, more compact devices inherently are realizable and manufacturing problems associated with forming very closely spaced electrodes are allevaited.

More specifically, then, in a second embodiment, and in other described variations of the second embodiment of this invention, there are disposed nonuniform, preferably graded, distributions of immobile ionized charge in the dielectric under each field-plate electrode and also under each space between adjacent field-plate electrodes in such a manner as to accomplish the function set forth in the paragraph immediately preceding.

In a third embodiment, and in other described variations of the third embodiment of this invention, which are in most respects functionally equivalent in operation to the above-described second embodiment, there is provided a graded density of dopant impurities adjacent to the surface of a semiconductive storage medium, the graded dopant density providing the requisite nonuniform distribution of immobile charge.

In still other embodiments described in detail hereinbelow, there is disclosed charge coupled apparatus employing combinations of immobile charge disposed in the dielectric and localized portions of immobile dopant impurities disposed near the storage medium-dielectric interface.

In still other embodiments described hereinbelow, there is disclosed the combining of electrodes which are nonuniformly spaced from the surface of the storage medium with immobile charge distributions to enable one-phase operation.

And in a last-described embodiment, there is disclosed a charge coupled device having a single electrode which comprises a metallic coating extending over the entirety of the information channel and in which one-phase operation is enabled through an appropriate distribution of immobile charge disposed either in the dielectric or in the storage medium along the information channel.

BRIEF DESCRIPTION OF THE DRAWING

It is believed the invention, including the aforementioned and other objects, characteristics, and advantages, and the invention in general, will be better understood from the following more detailed description taken in conjunction with the accompanying drawing in which.

DETAILED DESCRIPTION

Figure 1:
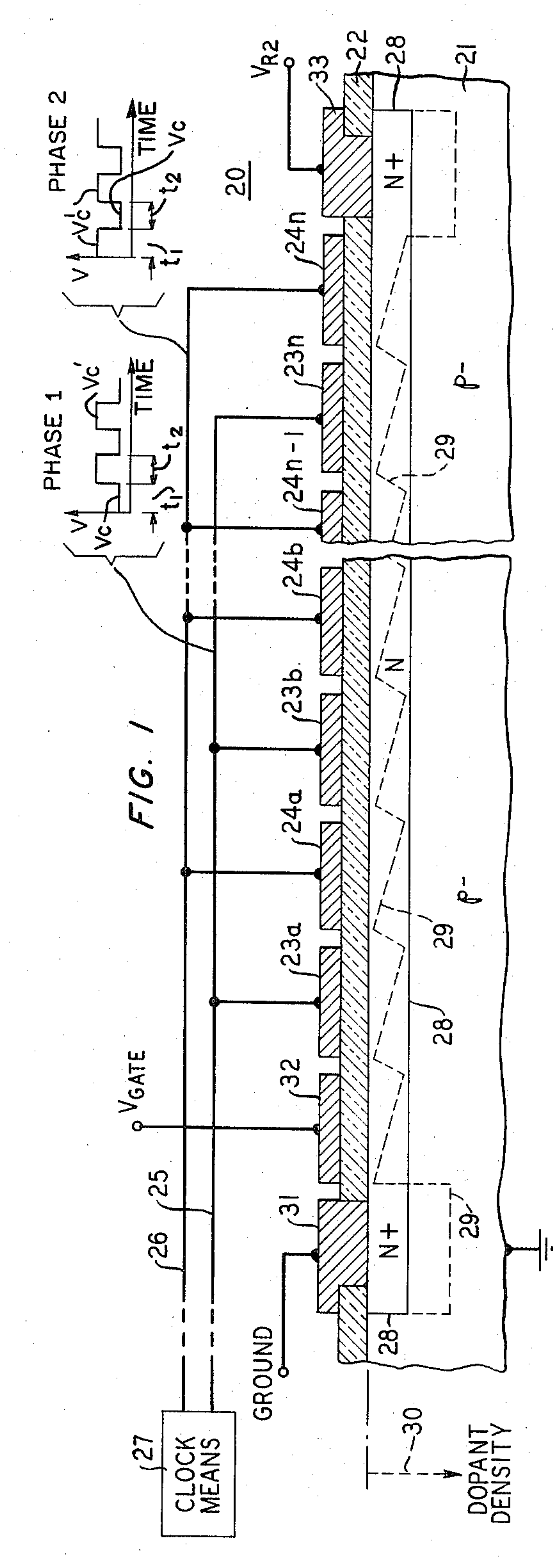
FIG. 1 is a cross-sectional view taken along the infromation channel of charge coupled apparatus in accordance with a first embodiment of this invention.

With more specific reference now to the drawing, FIG. 1 shows a somewhat schematic cross-sectional view taken along the information channel of two-phase CCD apparatus 20 as a first embodiment of this invention. As shown, apparatus 20 includes a $P^-$-type semiconductive storage medium 21 over which there is disposed an insulating layer 22 of substantially uniform quality and thickness. It will be appreciated that the storage medium 21 is shown as $P^-$-type semiconductive material for purposes of illustration only, and that it has been so shown for the reason that semiconductive CCD's are those devices of most immediately present interest; and in most semiconductive materials of present interest, N-channel devices are preferred to P-channel devices for optimum speed capability.

A plurality of field-plate electrodes 23*a*, 24*a*, 23*b*,...24*n* are shown disposed successively over insulator 22 so as to form a path, i.e., an information channel, along which mobile charge carriers representing information can be temporarily stored and transferred by application of appropriate drive voltages of these field-plate electrodes.

Further as shown in FIG. 1, electrodes numbered 23 are all connected to a common one of a pair of conduction paths 25 and 26 to which appropriate drive voltages are applied by clock means 27. The other field-plate electrodes, numbered 24, are connected to the other clock line 26.

Also in FIG. 1, in accordance with this invention, there is included in storage medium 21, and adjacent to the surface thereof, an N-type zone 28 of nonuniform dopant impurity concentration. The lateral and vertical extent of zone 28 is defined by the solid line to which reference numeral 28 is directed. Additionally, there is superimposed on storage medium 21 and zone 28 a somewhat schematic plot of the dopant density in zone 28, the density being depicted by broken line 29 with dopant density being plotted as increasing in the downward direction, as indicated by broken line arrow 30.

The operation of the apparatus of FIG. 1 will be described in detail with reference to FIG. 2, but first, with reference to FIG. 1, it should be noted that pulses representing information are coupled into the information channel by means of an input portion which includes a relatively heavily doped leftmost portion of zone 28, denoted as $N^+$, in combination with an electrode 31 which makes electrical contact to zone 28 and which, in turn, is connected to a fixed potential, typically ground, to which bulk portion 21 also is typically connected. The input portion additionally includes a gating electrode 32 which is adapted for connection to a source of pulsed potential $V_{GATE}$ for enabling or inhibiting the transfer of packets of charge from the $N^+$ source to the potential well under electrode 23*a* in accordance with signal information.

Also shown in FIG. 1 is an output portion including a similarly heavily doped $N^+$ rightmost portion of zone 28 disposed near the last field-plate electrode 24*n* in combination with an output electrode 33 which makes electrical contact thereto and to which a source of reference potential $V_{R2}$ is applied in polarity and magnitude such that the $N^+$ portion and the surface potential associated therewith acts as a collector of any mobile charge carriers which ultimately are transferred into the potential well under electrode 24*n*.

Figure 2:
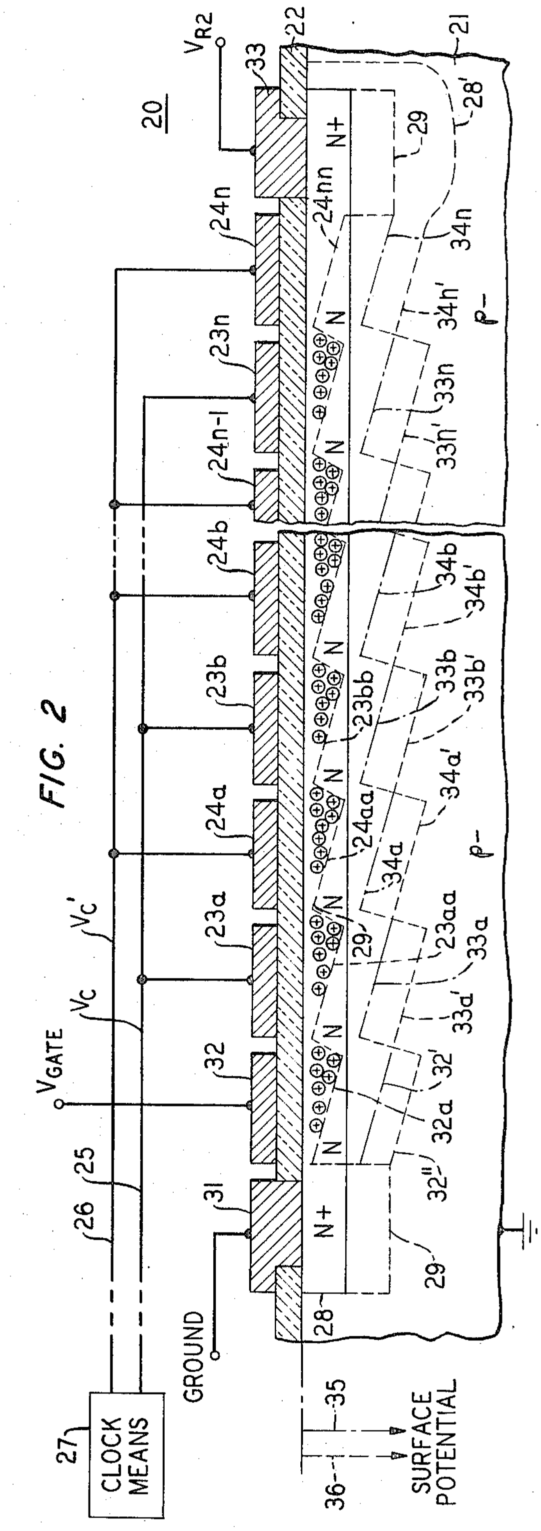
FIG. 2 depicts the apparatus of FIG. 1 upon which there is superimposed a somewhat schematic representation of the surface potential configurations resulting from typical contemplated drive and reference voltage applied in accordance with this invention.

In FIG. 2 there is shown the apparatus of FIG. 1 upon which there additionally is superimposed in the form of dot-dash lines and broken lines a schematic representation of the surface potential configurations resulting from typical contemplated drive and reference voltages applied in accordance with this invention.

As noted above, there is also represented in FIG. 2 by broken line 29 a somewhat schematic plot of the dopant density along the lateral extent of the N-type zone defined within solid line 28. As shown, the dopant density in zone 28 has been formed with a sawtooth density profile. More specifically, zone 28 includes a plurality of regions 32*a*, 23*aa*, 24*aa*, 23*bb*,...24*nn*, one of which is disposed under each of the field-plate electrodes and in each of which the concentration of dopant impurities is shown as increasing linearly to the right. In each of the regions under the field-plate electrodes where the dopant impurities increase linearly to the right, the dopant concentration, $f(x)$, is a continuously monotonically increasing function of position, $x$, in each region and is therefore, a single-valued function, without breaks, which satisfies the relation $f(x_1)<f(x_2)$ if $x_1<x_2$. If the dopant concentration in a region decreases to the right, as will be later discussed, the dopant concentration is a continuously monotonically decreasing function which is also single-valued, but satisfies the relation $f(x_1)> f(x_2)$ if $x_1<x_2$. More generally, both the ncreasing and decreasing dopant densitites are a continuously monotonically varying distribution.

Analysis shows that the surface potential of the storage medium in such a structure is affected by immobile charge disposed under the electrodes adjacent to the storage medium in an amount nearly linearly poroportional to the amount of charge at any given point. That is, if there is a continuously monotonically varying distribution of immobile charge, there results a continuously monotonically varying surface potential which is a single-valued function that either decreases or increases. As a result, application of a positive voltage to any of field-plate electrodes 32, 23*a*, 24*a*,...24*n* produces under such electrodes a surface potential which increases linearly to the right in FIG. 2, provided the voltage is sufficient to cause depletion of free carriers associated with the dopant impurities in the sawtooth density profiles. It will be appreciated that, if the ionized donors associated with the sawtooth density profiles are not depleted of free charge carriers, their effective charge will have no effect on the surface potential, inasmuch as such effective charge will be neutralized by the electrons associated with the donor impurities.

In operation, two-phase clock voltages $Vc$ and $Vc'$, shown at time interval $t_1$ in the clock waveform diagram in FIG. 1, both positive, are applied alternately to conduction paths 25 and 26. It will be appreciated that intially, with no voltages applied, the sawtooth density profiles in zone 28 have no effect on the surface potential because in such condition the structure is at thermal equilibrium, in which case the positive charge of each donor impurity is effectively cancelled by a corresponding electron associated with that donor impurity. However, initial application of sufficiently large voltages *Vc* and *Vc'* (where, arbitrarily, *Vc'* is assumed to be greater than *Vc*) to conduction paths 25 and 26, respectively, quickly causes the free electrons in zone 28 to become localized in the potential wells produced under electrodes 23 and 24 by voltages *Vc* and *Vc'*. And, more specifically, since *Vc'* is more positive than *Vc*, the free electrons under each electrode 23 are drawn into the deeper (more positive) potential well under the particular electrode 24 immediately to the right, i.e., the free electrons under electrode 23*a* are drawn into the potential well under electrode 24*a*, the free electrons under electrode 23*b* are drawn into the potential well under electrode 24*b*, etc. Of course, it is assumed that the potential *Vc'* is sufficiently more positive than *Vc* to cause the described localization of free electrons into packets under electrodes 24.

In this condition now, the donor impurities in the surface portions under electrodes 23 are depleted of free electrons; and so the surface potentials thereunder are as depicted by dot-dash lines 33*a*, 33*b*,...33*n*, i.e., increasing to the right because of the effect of the depleted donor impurities in regions 23*aa*, 23*bb*,...23*nn*. Therefore, if now the clock voltages are reversed, as shown at time intervals $t_2$ in the clock waveform diagram in FIG. 1, such that *Vc* is applied to clock line 26 and *Vc'* is applied to clock line 25, the configuration of the surface potentials under electrodes 23 will remain substantially the same but will be increased in magnitude, e.g., to the positions depicted by broken lines 33*a'*, 33*b'*,...33*n'*; and the free electrons previously localized under electrodes 24 will be drawn one step to the right into the now more positive surface potentials under electrodes 23. That is, the electrons under 24*a* will transfer under 23*b*; the electrons under 24*b* will transfer under electrode 23*c*, etc. This preferential transfer to the right is, of course, caused by the indicated asymmetry in potential wells (surface potential configurations) which, in turn, is caused by the successive depletion of the donor impurities in zone 28.

It will be seen now that, upon each successive reversal (alternation) of the clock voltages, the localized packets of free electrons are transferred one step (one electrode) to the right until, after *n*-clock cycles, all the free electrons have been transferred into the potential well under electrode 24*n* and have been swept out of the information channel by the output portion to which $V_{R2}$ is applied.

After all of the free electrons from the donor impurities have been thus swept out and before any mobile electrons representing information are introduced from the input portion, each succeeding alternation of the clock voltages produces, under electrodes 23 and 24, surface potential configurations as represented by dot-dash lines 33*a*, 34*a*, 33*b*,...34*n* when the lesser clock voltage is applied and surface potential configurations as represented by broken lines 33*a'*, 34*a'*, 33*b'*, 34*b'*,...34*n'* when the greater clock voltage is applied. The dot-dash arrow 35 and the broken line arrow 36 appearing at the left of FIG. 2 are intended to indicate that surface potential is plotted as increasing in the downward direction.

It will be appreciated, now, that with the above-described voltages applied the surface potential under each of the field-plate electrodes increases substantially linearly to the right and, additionally, the surface potentials 341', 34*b'*, ...34*n'* under electrodes 24 are at all points more positive than the surface potentials 33*a*, 33*b*,...33*n* under electrodes 23, when *Vc'* is applied to clock line 26 and *Vc* is applied to clock line 25. Thus, any mobile electrons under electrodes 23 will be swept into the potential well under the electrode 24 thereadjacent to the right.

Upon reversal of clock voltages, the deeper potential wells will be under electrodes 23, i.e., as represented by broken lines 33*a'*, 33*b'*,...33*n'* in FIG. 2; and the shallower potential wells will appear under electrodes 24 as represented by dot-dash lines 34*a*, 34*b*,...34*n*. In this reversed condition, any mobile electrons which were stored under electrodes 24 will now be transferred into the deeper potential well under electrode 23 thereadjacent to the right. And upon each subsequent reversal of the clock voltages, mobile carriers will correspondingly be advanced one electrode to the right.

To complete the description of the operation of FIG. 2, mobile charge (electrons) carriers are introduced into the information channel by applications of a suitably positive pulse $V_{GATE}$ to gating electrode 32 which causes the surface potential thereunder to assume that depicted by broken line 32''. In this condition, electrons are drawn from the $N^+$ input portion into the region of more positive surface potential depicted by broken line 32''. This positive pulse is applied to electrode 32 during the portion of the clock cycle in which the lesser of the two clock voltages is applied to electrode 23*a* so as to avoid flooding the channel with electrons. Before the clock voltages reverse, or in synchronization with the reversal of the clock voltages, $V_{GATE}$ is reduced to an amount sufficient to produce under electrode 32 a surface potential only as great as depicted by broken line 32'. In this manner, when the greater of the two clock voltages is applied to electrode 23*a*, the mobile carriers previously drawn from the $N^+$ input into the potential well under electrode 32 are transferred into the now more positive potential well 33*a'* under electrode 23*a*.

Eventually, in operation, a packet of charge so introduced into the beginning of the information channel will be transferred under the last electrode 24*n*, in which case it will be drawn into the more positive potential well depicted by 28' under the $N^+$ output portion. It is seen that the $N^+$ output portion thus acts analogous to a collector in an ordinary transistor; and, accordingly, any charge drawn thereinto will manifest itself as a current flowing through the circuit attached to electrode 33 and can be detected by any of a variety of means now well known in the art.

Of course, in the foregoing and in the succeeding detailed descriptions, it is assumed, as in all charge transfer device operation, that the frequency of clock cycles is sufficiently great that the described effects are not nullified by recombination-generation in the semiconductive storage media.

Figure 3:
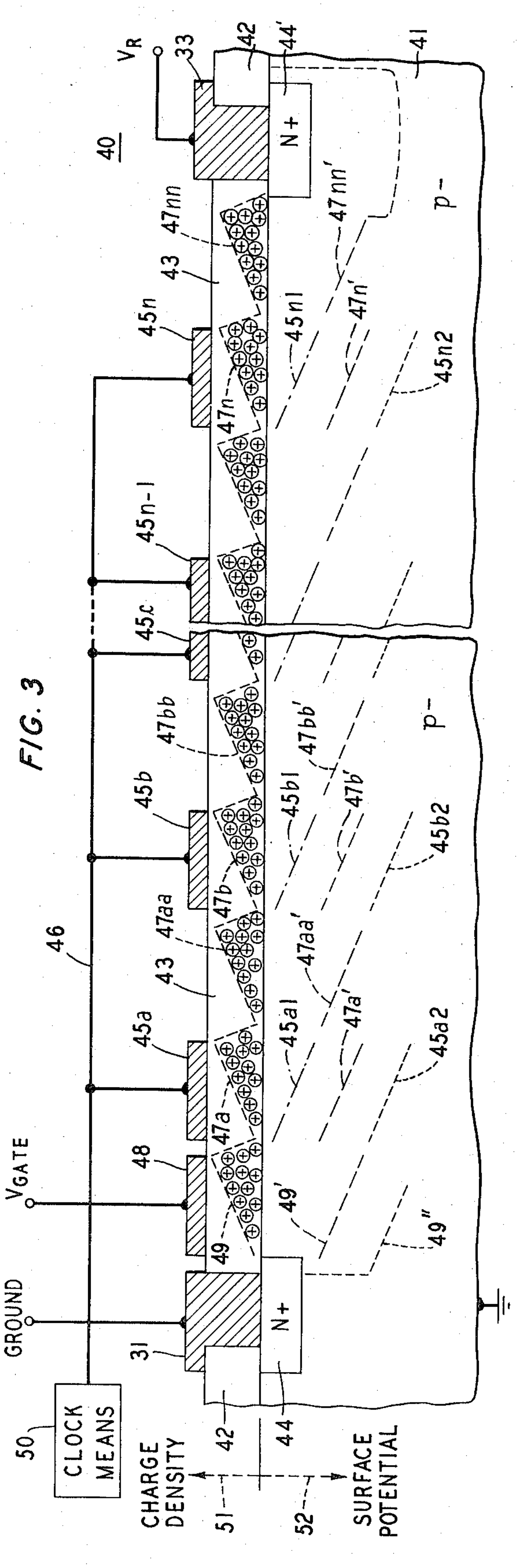
FIG. 3 is a somewhat schematic cross-sectional view taken along the information channel of charge coupled apparatus employing graded distributions of immobile charge in the dielectric layer in accordance with a second embodiment of this invention and which further depicts schematically the various surface potential configurations resulting from typical contemplated drive and reference voltages also in accordance with this invention.

With reference now to FIG. 3, there is shown a somewhat schematic cross-sectional view taken along the information channel of charge coupled apparatus in accordance with the instant invention and in which graded distributions of immobile charge are disposed in the dielectric layer in such a manner that the interelectrode spaces can be used as active members in the charge transfer process.

More specifically, in FIG. 3 there is depicted a portion 40 of a one-phase CCD having a $P^-$-type semiconductive storage medium 41 in which there is disposed a conventional $N^+$ input zone 44 for providing a source of mobile charge carriers for introduction into the information channel and a second conventional $N^+$ zone 44' for providing a collector of mobile charge carriers at the output of the information channel. As shown, an electrode 31 is disposed to make electrical contact to input zone 44 and is shown connected to ground potential to which the storage medium 41 also typically is connected. An electrode 33 is disposed to make electrical contact to $N^+$ output zone 44' and is connected to a source of positive potential $V_R$ of sufficient magnitude for causing zone 44' to assume at all times a more positive potential than the potential occurring under the output of the information channel.

Also shown in FIG. 3 is a dielectric layer comprising two distinct regions 42 and 43. Region 42 lies outside the information channel and is a substantially uniform, typically undoped insulator. Dielectric portion 43 is disposed over the desired information channel and includes a plurality of regions of immobile ionized charge having a sawtooth density profile, with the density being plotted upward in FIG. 3 as indicated by broken line arrow 51. Disposed over dielectric portion 43 are a plurality of CCD field-plate electrodes *45a*, *45b*,...*45n* which are connected to a single conduction path 46, which, in turn, is connected to a one-phase clock means 50. FIG. 7A is a diagram depicting a one-phase waveform suitable specifically for use with the embodiment of FIG. 3 and generally for use with the other one-phase embodiments described in detail hereinafter. Additionally, there is disposed over dielectric region 43 a gating field-plate electrode 48 for enabling the selective gating of mobile carriers representing information from source 44 into the information channel. For the purposes of this invention, and for the purposes of the claims appended to the specification, gating electrode 48 and the portion of the apparatus thereunder will be considered to be a portion of the information channel.

More specifically now, in dielectric portion 43 there is shown a plurality of regions in each of which the density of immobile, positively ionized charge increases to the right. As seen, a separate one of such regions, *47a*, *47b*,...*47n* is disposed under each of the CCD field-plate electrodes *45a*, *45b*,...*45n*. Additionally, other separate ones of such regions *47aa*, *47bb*,...*47nn*, preferably identical to regions *47a*, *47b*,...*47n*, are disposed under each of the spaces between electrodes 45. And, further, it is seen that another of such regions 49 is disposed under the gating electrode 48.

The effect of regions 47 and 49 is to produce in storage medium 41 a quiescent surface potential, the configuration of which is represented by broken lines *47a'*, *47aa'*, *47b'*, *47bb'*,...*48nn'*, and 49'. As indicated by the broken line arrow 52 at the left of FIG. 3, surface potential is plotted as increasing downward in FIG. 3. The surface potential configurations represented by dot-dash lines *45a1*, *45b1*,...*45n1* disposed under electrodes *45a*, *45b*,...*45n*, respectively, are produced by application of a first positive potential, denoted $V_L$ in FIG. 7A, less than the quiescent potential, to conduction path 46 which, of course, causes this first potential to be applied to each of the electrodes 45. Thus, under electrode *45a* and the space next adjacent to the right there appears a linearly graded potential well represented by dot-dash line *45a1* and *47aa'*and in which any electrons will be drawn to the right because of the increasing potential in that direction. Similar potential wells appear under each of the electrodes 45 and the space next adjacent each of such electrodes to the right, e.g., the potential well including dot-dash lines *45b1* and broken line *47bb'*under electrode *45b* and the space next adjacent to the right.

Application of a greater positive voltage $V_G$, i.e., greater than the quiescent potential, to electrodes 45 via conduction path 46 causes a vertical displacement downward of the potential configuration under electrodes 45 to the positions indicated by broken lines *45a2*, *45b2*,...*45n2*. It is seen that in this last-mentioned condition the surface potential to the right of each of the interelectrode spaces is at all points greater than the surface potential under the interelectrode spaces. Accordingly, any electrons which had come to rest in the potential wells under the interelectrode spaces are now drawn into the more positive surface potentials under electrodes 45. And, in like manner, at each alternation of the clock voltages between the greater and lesser voltage mobile charge carriers are moved one step to the right in FIG. 3 and eventually are collected by the more positive potential applied to output zone 44'.

Mobile charge carriers representing information are introduced into the information channel by application of a sufficiently positive voltage to gating electrode 48 to produce thereunder a surface potential of relative magnitude depicted by broken line 49'' which, as shown, can be about the same magnitude as the greater surface potential *45a2* under electrode *45a*. The surface potential under electrode 38 is made to assume that depicted by broken line 49'' while the lesser clock voltage is applied to electrodes 45 so as to avoid flooding the information channel and then the voltage $V_{GATE}$ is removed from gating electrode 48 before or synchronously with the next clock voltage alternation.

An important feature to be noted in FIG. 3 is that locally nonuniform, and preferably graded, distributions of immobile charge are disposed both under the electrodes and in the interelectrode spaces in sufficient quantity and polarity so that, in the absence of voltages applied to the field-plate electrodes, i.e., in the quiescent condition, the surface potential under the interelectrode spaces assumes approximately the same configurations and values as does the surface potential under the electrodes. Once this feature, termed "mutual asymmetry," obtains, the method of operation is simply to vary the surface potential under the electrodes alternately above and below that of the surface potential under the interelectrode spaces so as to alternately transfer charge into and then draw charge from the potential wells under the interelectrode spaces. These features and principles are generic to this form of the invention and can be manifested in a wide variety of ways, a few of which are depicted in the remaining figures of the drawing.

Figure 4:
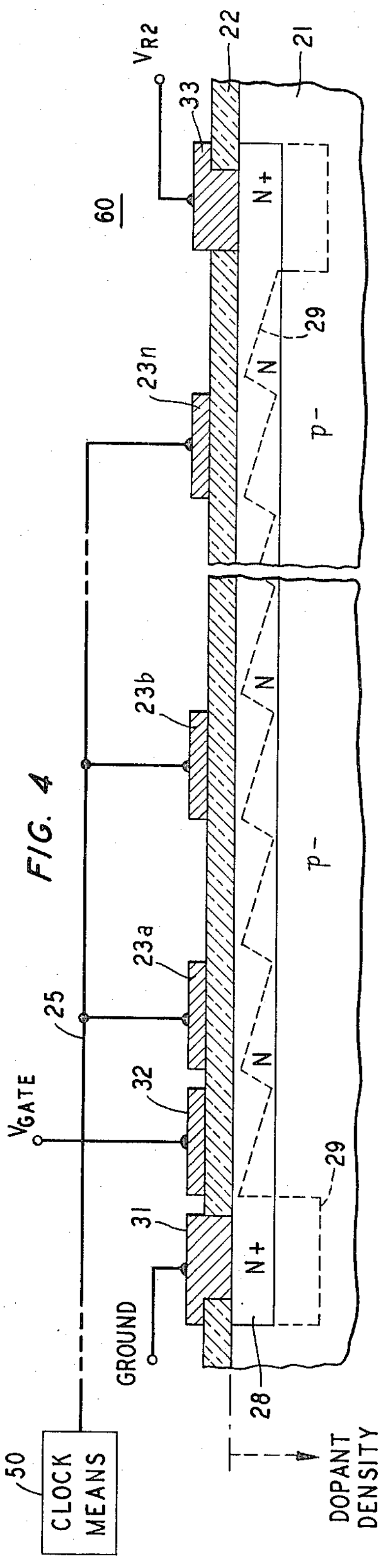
FIG. 4 is a cross-sectional view taken along the information channel of charge coupled apparatus in accordance with a third embodiment of this invention in which nonuniform concentrations of dopant impurities are employed in accordance with this invention.

In FIG. 4, for example, there is depicted a cross-section of CCD apparatus substantially identical to that depicted in FIGS. 1 and 2, except that every other field-plate electrode, i.e., electrodes 24, and one of the clock lines, 26, have been removed. More specifically, in FIG. 4 the apparatus 60 includes a storage medium 21 which may be identical to that in FIGS. 1 and 2 and includes an N-type zone 28 extending along the entire length of the channel and having a sawtooth density profile depicted by broken line 29. A dielectric layer 22 is disposed over storage medium 21; and over layer 22 there is disposed a plurality of field-plate CCD electrodes 23*a*, 23*b*,...23*n*, each of which is connected to a common conduction path 25, which, in turn, is connected to a one-phase clock means 50. Also shown, of course, is a gating electrode 32 to which pulses $V_{GATE}$ are applied to selectively introduce mobile charge carriers representing information into the information channel.

It will be appreciated that, as with the apparatus of FIGS. 1 and 2, with no voltages applied to the apparatus of FIG. 4, no quiescent surface potentials are produced by the sawtooth density profiles because the structure is at thermal equilibrium in which the positive charge associated with each ionized donor is effectively cancelled by an electron associated with that donor. However, in direct analogy to the description with respect to FIG. 2, successive application of *n*-clock cycles to the structure of FIG. 4 sweeps the free electrons from the donor impurities in zone 28; and afer all of the free electrons from the donor impurities have been thus swept out and before any mobile carriers are introduced from the input portion, each alternation of the clock voltage produces under electrodes 33 surface potential configurations as represented by broken lines 63*a*, 63*b*,...63*n* when the greater clock voltage is applied and surface potential configurations as indicated by dot-dash lines 64*a*, 64*b*,...64*n* when the lesser clock voltage is applied. After the free electrons have been swept from the donors under the interelectrde spaces, the resulting surface potential configurations thereunder are as represented by broken lines 62*a*, 62*b*,...62*n*, where, as in the previous figures, surface potential is plotted as increasing downward as indicated by broken line arrow 61.

In operation, then, mobile charge carriers (electrons) representing information are gated into the information channel by application of a sufficiently positive voltage $V_{GATE}$ to cause the surface potential under gating electrode 32 to assume approximately the relative magnitude indicated by broken line 65 while the clock voltage is at its lesser potential such that the surface potential under electrode 23*a* is as indicated by dot-dash line 64*a*. Then the voltage $V_{GATE}$ is reduced before or synchronously with the clock cycle as the clock potential switches to its greater magnitude. In this manner, the surface potential under electrode 32 is decreased to a value 65' less than that of the surface potential 63*a* under electrode 23*a* so that electrons are drawn from the potential well under electrode 32 and into the potential well 63*a* under electrode 23*a*. Successive alternations of the clock voltages cause these electrons to be transferred successively to the right in FIG. 5.

Figure 5:
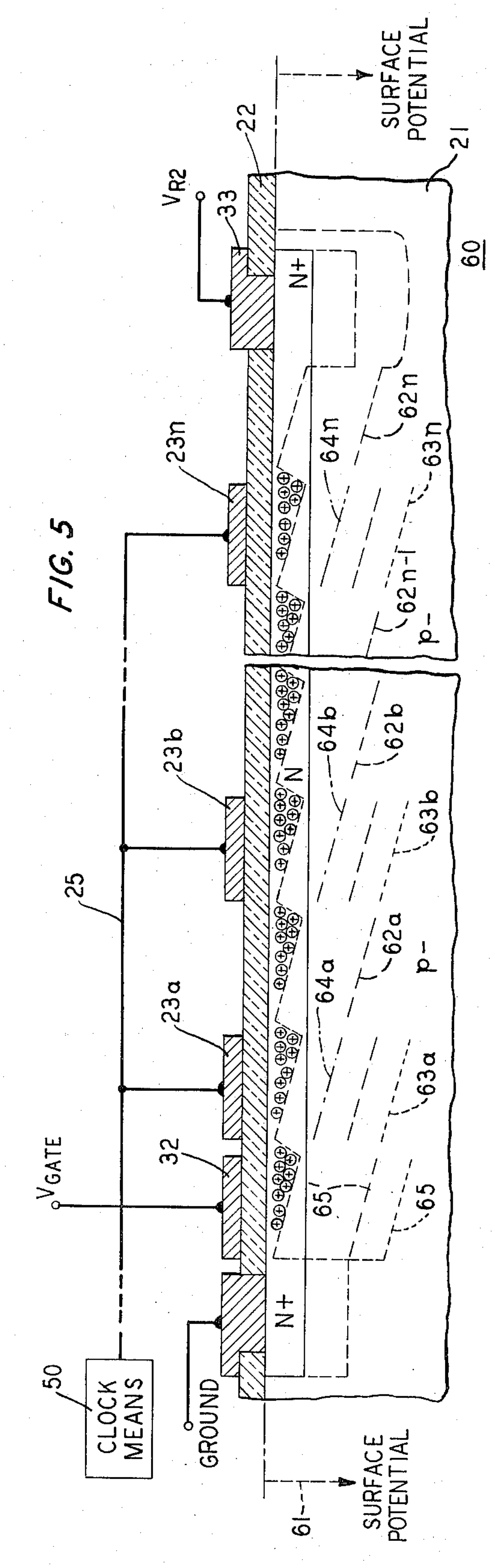
FIG. 5 depicts the apparatus of FIG. 4 upon which there is superimposed a schematic representation of the surface potential configurations resulting from typical contemplated drive voltages and reference voltages applied in accordance with this invention.

The apparatus of FIGS. 4 and 5 is thus seen to operate substantially the same as the apparatus of FIG. 3 after the initial *n*-cycles of operation to sweep out the free electrons associated with the donor impurities. In theory, neither the apparatus of FIG. 3 nor the apparatus of FIGS. 4 and 5 can be said to be preferred over the other, since, in theory, the operation can be made to be identical. However, in practice there is no presently known technique for forming stable doped oxides; and so, in practice the apparatus of FIGS. 4 and 5 is presently preferred.

In CCD apparatus of the types depicted above in FIGS. 1–5 and in the subsequent figures, it is advantageous to adjust the nonuniformity of fixed charge so as to produce potential wells of asymmetry, i.e., with electric field components tangential to the storage medium, sufficient to cause mobile cahrge subject thereto to be propelled at speeds approaching scattering limited velocities. In silicon such fields are known to be in the range of $10^3$ to $10^4$ volts per centimeter. Calculations have shown that, in the sawtooth profiles and in the stepped approximations thereto, if the lesser density of immobile charge is about 4 or $5\times10^{11}$ per square centimeter and the greatest density is about $10^{12}$ per square centimeter and this variation is over an electrode width (or interelectrode width) of about 20 microns ($2\times10^{-3}$ centimeters), tangential fields approaching the scattering limited velocity range are attained.

Figure 6:
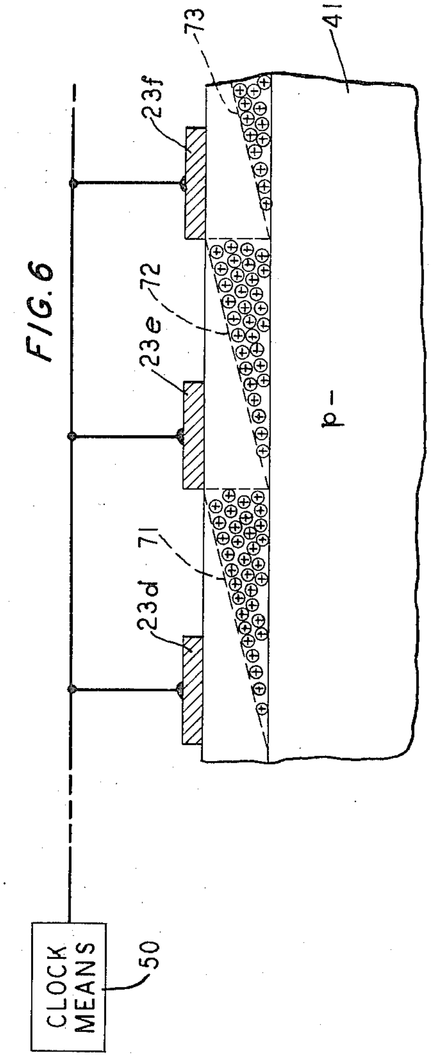
FIG. 6 is a somewhat schematic cross-sectional view taken along the information channel of a portion of charge coupled apparatus similar to that depicted in FIG. 3 but modified so that each gradient of immobile charge is shared by an electrode and the interelectrode space there-adjacent.

Turning now to FIG. 6, there is depicted a cross-section 70 of a small portion of an information channel similar to that depicted in FIG. 3 in which the insulator includes nonuniform concentrations of immobile impurities and which is adapted for one-phase operation. The only difference from the apparatus of FIG. 3 is that in FIG. 6 each region of increasing density of immobile charge is shown to extend under an electrode and under the interelectrode space thereadjacent to the right. More specifically, region 71, in which the concentration of the mobile positive charge increases to the right, is disposed both under electrode 23*d* and the space between 23*d* and electrode 23*e*. Similarly, zone 72 of immobile charge is disposed under electrode 23*e* and also under the space between electrode 23*e* and electrode 23*f*. It will be appreciated that such an immobile charge distribution can be made to produce surface potentials like those shown in FIG. 3, provided a suitable DC offset is provided to the clock means. Similarly, of course, zones 71, 72, and 73 of linearly graded immobile charge concentration could as well be provided in the form of N-type dopant impurities analogous to FIGS. 4 and 5.

It is appreciated that in practice linearly graded profiles of immobile charge may not be easily obtainable. However, this does not represent a problem for the instant invention, inasmuch as for small electrodes the linearly graded profile may be approximated by a single step approximation, i.e., for each desired linearly graded region of immobile charge there is substituted instead a region comprising two distinct parts, in each of which the charge concentration is substantially uniform and in one of which the charge concentration is greater than in the other. In this context, the term "small" electrode includes electrodes whose lateral dimension along the information channel is of the order of the depletion depth produced in opration in the storage medium. For example, if the storage medium is 10 ohm-centimeter P-type and dielectric thickness is about 1,000 A ($1\times10^{-5}$ centimeters), the depletion depth produced at 10 volts is about 5 microns. In practice, with such a depletion depth it has been found analytically that, for electrodes of less than about 20 microns lateral dimension along the information channel, there is little or no distinguishable difference in operation between apparatus having a single step approximation to the linear grading and an apparatus having a true linear grading. For larger electrodes, of course, multi-step approximations to linear grading may be used, as necessary.

Figure 7:
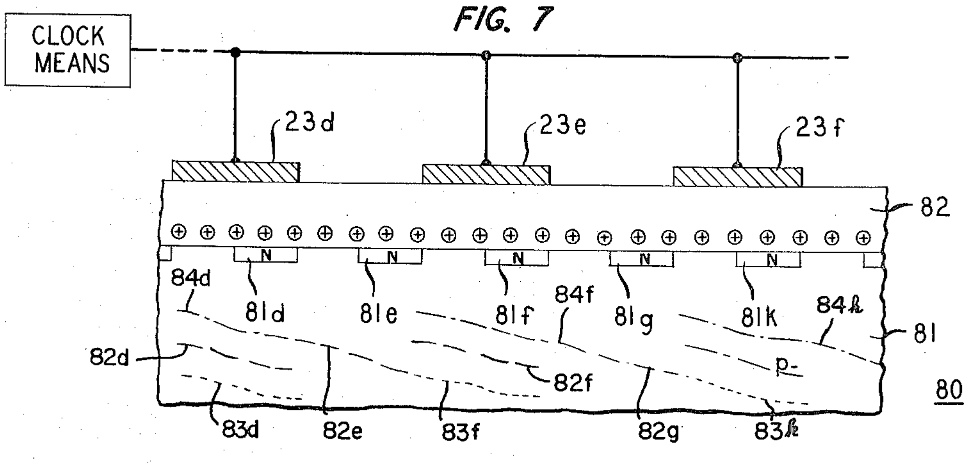
FIG. 7 is a somewhat schematic cross-sectional view taken along the information channel of a portion of charge coupled apparatus which employs a combination of a uniform distribution of immobile charge and localized zones having substantially constant concentrations of immobile charge in accordance with this invention.
Figure 7A:
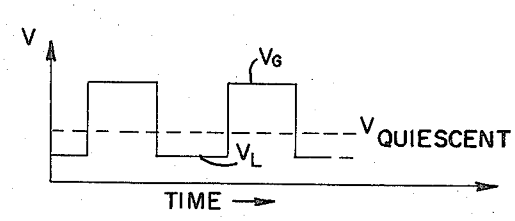

With reference now to FIG. 7, there is shown a somewhat schematic cross-sectional view taken along the information channel of a portion 80 of charge coupled apparatus in accordance with still another embodiment of this invention which includes a uniform distribution of immobile charge in a dielectric layer 82, this charge being represented by the encircled plus signs, in combination with N-type localized zones 81*d*, 81*e*, 81*f*, 81*g*, and 81*h*, each of which is disposed in a $P^-$-type storage medium 81 and under the rightmost half of each field-plate electrode 23*d*,23*e*, and 23*f* and of each interelectrode space. By analogy to the modes of operation described with reference to the preceding figures, it will be appreciated that in operation the N-type zones of FIG. 7 provide localized portions of immobile positive charge to produce approximately linearly varying potential well configurations, indicated by broken lines 82–84 (analogous to potential wells 62–64 in FIG. 5), suitable for one-phase operation in accordance with this invention.

Figure 8:
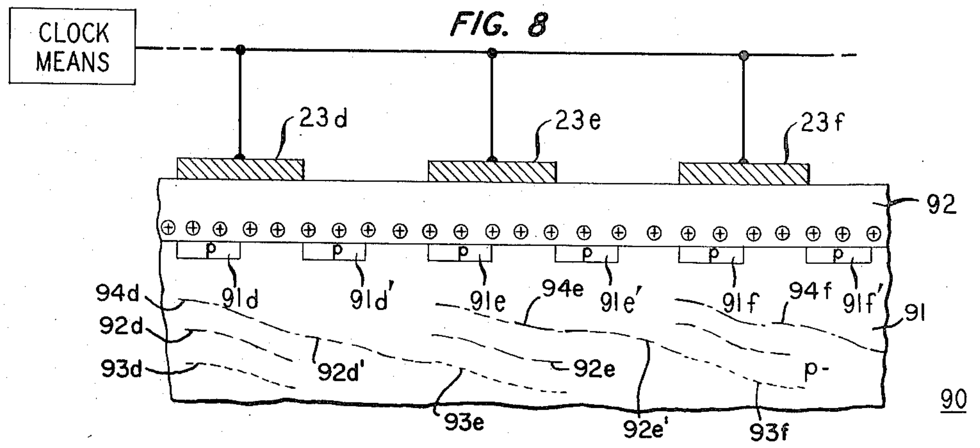
FIG. 8 depicts a structure which is complementary to that depicted in FIG. 7.

In FIG. 8 there is shown a schematic cross-section of a portion 90 of a CCD structure which is complementary to that depicted in FIG. 7. More specifically, there is shown the uniform distribution of positive charge in a dielectric 92 and, in contradistinction to FIG. 7, there is shown a plurality of localized P-type zones 91*d*, 91*d'*, *91e*, 91*e'*, *91f*, and 91*f'*, each of which is relatively heavily doped with respect to the P -type bulk portion 91 of the storage medium and each of which in operation provides negative immobile charge in the form of ionized acceptors, which has the effect of producing potential wells of configurations indicated by broken lines 92–94 similar to those produced in the apparatus of FIG. 7.

At this point, it should be appreciated that the word "complementary," as used with respect to the apparatus of FIGS. 7 and 8, is apt because the only difference between the two structures is that opposite type impurities are disposed under opposite halves of the electrodes and of the interelectrode spaces, both structures nevertheless producing the same surface potential configurations with applied voltage. And, of course, this principle of "complementarity" may be employed similarly to vary the other described embodiments of this invention.

Additionally with respect to FIGS. 7 and 8, it will be appreciated first that the uniform distribution of positive charge shown disposed in the dielectric (82 or 92) can as well be provided by a uniform distribution of N-type dopant impurities adjacent the semiconductive surface. However, structures of most immediate intersect include silicon as the semiconductive storage medium 21 and silicon dioxide as the dielectric layer 22. In practice, in such structures there is always some relatively uniform distribution of fixed positive charge in the silicon oxide as it is conventionally formed. Concentrations of such positive charge typically are in the range of $5\times10^{10}$ to $10^{12}$ per square centimeter; and this has been found to be a usable range for N-channel devices.

Still further with respect to FIGS. 7 and 8, it is contemplated that in a typical embodiment thereof the background density of acceptor impuritites in the bulk portion (81 or 91) of the storage medium may be in the range of about $5\times10^{14}$ per cubic centimeter and that the concentration of N-type impurities of zones 81 in FIG. 7 and the concentration of P-type impurities in zones 91 of FIG. 8 may be in the range of about $10^{17}$ per cubic centimeter.

Still further with respect to FIG. 7, it is not essential to operation that the N-type zones be completely depleted on electrons in operation. With incomplete depletion the electric field along the channel will be reduced; but unidirectionality of charge transfer will obtain because the undoped regions along the surface will provide barriers to prevent charge flow in the reverse direction. Thus, it is seen that the N-type zones may be very heavily doped so that in operation they are not depleted, in which case the charge transfer will be essentially the same as in a "bucket-brigade " type of charge transfer apparatus. In summary, then, it is seen that, if the N-type zones in FIG. 7 are heavily doped, the structure can be operated as a one-phase bucket-brigade.

Figure 9:
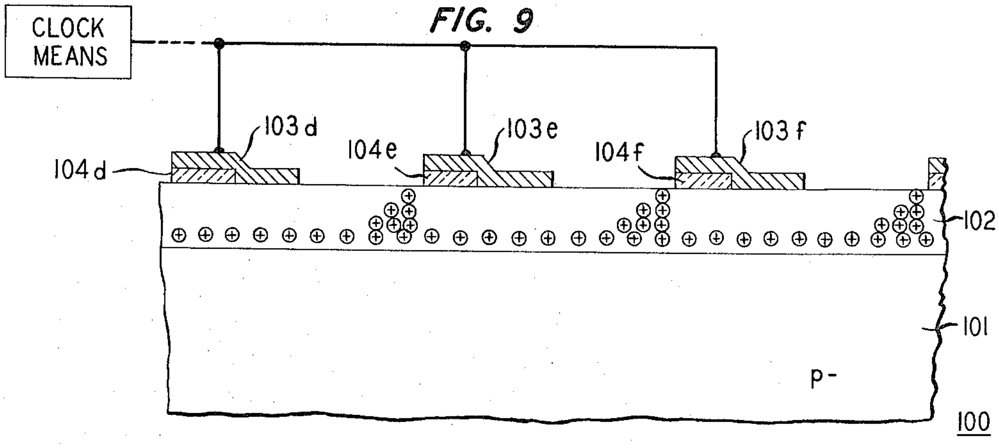
FIG. 9 depicts a somewhat schematic cross-sectional view taken along the information channel of a portion of charge coupled apparatus employing electrodes nonuniformly spaced from the surface of the storage medium and additionally employing nonuniform distributions of immobile charge in accordance with this invention.

With reference now to FIG. 9, there is shown a schematic cross-section taken along an intermediate portion 100 of the information channel of charge coupled apparatus, in accordance with still another embodiment of this invention. As shown, portion 100 includes a $P^-$ type semiconductive storage medium 101, over which there is disposed a dielectric layer 102 which includes a nonuniform concentration of immobile charge, the concentration being designated by the density of encircled plus signs. Additionally, there is disposed over layer 102 a plurality of electrodes 103*d*, 103*e*, and 103*f*, each of which includes a leftmost portion disposed at a greater distance from the surface of the storage medium than its rightmost portion. More specifically, there is disposed underneath the leftmost portions of electrodes 103 an additional dielectric portion 104, more particularly, 104*d*, 104*e*, and 104*f*.

In operation, the concept of mutual asymmetry is achieved in the apparatus of FIG. 9 in that the differential spacing of each electrode from the surface storage medium 101 is adjusted to produce under each such electrode a potential well of asymmetrical configurations similar to that produced by the nonuniform concentration of immobile charge disposed in the interelectrode spaces. Such adjustment will be apparent to those in the art, especially in view of the teachings contained in the copending U.S. Pat. application, Ser. No. 11,448, filed Feb. 16, 1970, now U.S. Pat. No. 3,651,349, issued May 21, 1970, disclosing CCD apparatus having electrodes which are nonuniformly spaced from the surface of the storage medium.

Although it may appear that fabrication of a structure depicted in FIG. 9 would be more complex than fabrications of structures in the previous figures, such is not necessarily the case. For example, electrodes 103 may be used as a mask through which the nonuniform concentrations of impurities in the interelectrode spaces may be formed by ion implanatation, with the implanted ions impinging on the surface of the device at a variable angle. Although such a method of fabrication may be advantageous, it is not an essential part of this invention and so will not be described in greater detail herein.

Figure 10:
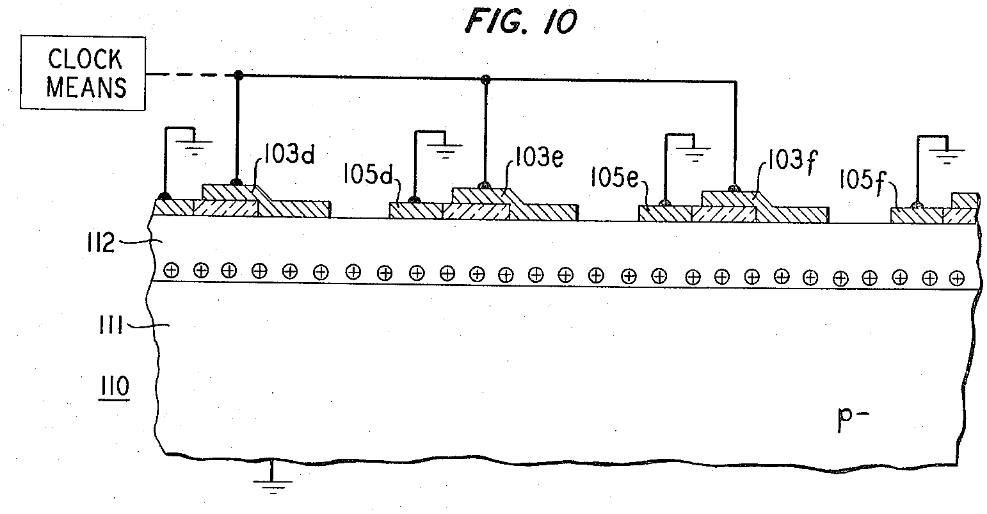
FIG. 10 depicts a variant of the apparatus depicted in FIG. 9 and in which a uniform distribution of immobile charge and an additional DC-biased electrode is used to effect the desired mutually asymmetric surface potential configuration in the interelectrode spaces.

With reference now to FIG. 10, there is disclosed still another embodiment in accordance with this invention. It will be seen that the apparatus 110 of FIG. 10 differs from the apparatus 100 of FIG. 9 only in that dielectric layer 112 over storage medium 111 of FIG. 10 includes a uniform distribution of immobile ionized charge; and to produce the asymmetry in the interelectrode spaces, an additional set of electrodes 105*d*, 105*e*, and 105*f* has been disposed over half of each interelectrode space and electrodes 105 have been connected to ground potential to which the storage medium 111 also is connected. In the apparatus of FIG. 10, the asymmetry in the potential wells occurring between electrodes 103 is produced by the ground potential which, through electrodes 105, is applied to the surface of half of each interelectrode space.

Although it is recognized that fabrication of a structure of the type depicted in FIG. 10 and, in particular, the formation of electrodes 105 is necessarily somewhat more complex than fabrication of previously described structures, such increased complexity in fabrication may be offset by the operational advantage achieved due to the increase in capacitance in the interelectrode spaces due to electrodes 105. Such advantageous effect on operation is analogous to that described in greater detail hereinbelow with reference to FIG. 11, wherein relatively heavily doped P-type localized zones are disposed adjacent the surface of the storage medium under the interelectrode spaces.

Figure 11:
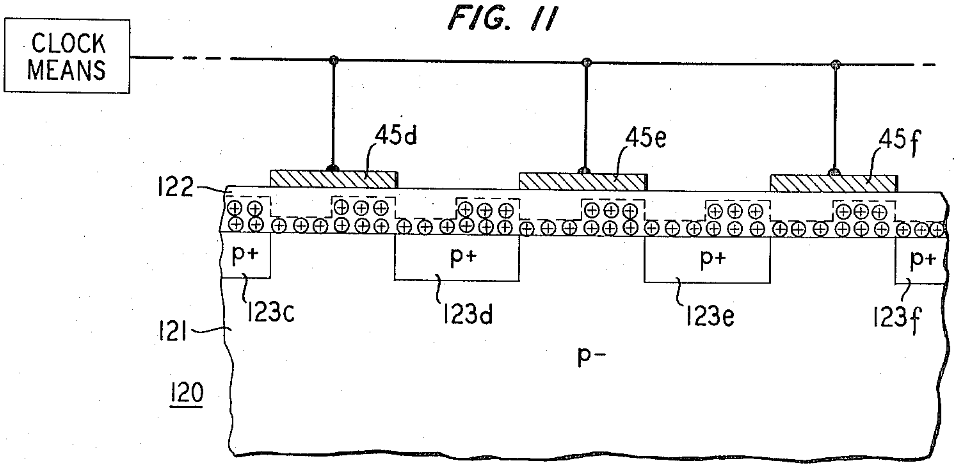
FIG. 11 is a somewhat schematic cross-sectional view taken along the information channel of a portion of charge coupled apparatus in which relatively heavily doped surface zones are employed in combination with nonuniform concentrations of immobile charge to improve the charge storage capability of the potential energy minima under the interelectrode spaces.

With reference now to FIG. 11, there is shown a schematic cross-sectional view taken along a portion 120 of the information channel of charge coupled apparatus similar to that disclosed in FIG. 3, except that in FIG. 11 the linear grading has been approximated by a one-step approximation utilizing immobile ionized charge in the dielectric layer 122 which overlies the surface of storage medium 121. Additionally, in FIG. 11 there is disposed under the interelectrode spaces a plurality of $P^+$-type localized zones 123*c*, 123*d*, 123*e*, and 123*f*, in each of which the concentration of acceptor impurities is substantially constant and of magnitude typically in the range of $10^{16}$ to $10^{18}$ per cubic centimeter for applied voltages in the range of zero to 20 volts. Zones 123 optionally may be used to enhance the performance of one-phase devices wherein portions of the storage medium under the electrode spaces are used as active members in the charge transfer process in that zones 123 increase the capacitance associated with the interelectrode spaces and thus increase the effective signal charge handling capability for a given magnitude of clock driving potential. This fact is seen from a simple analysis, relying on the basic equation that charge is equal to capacitance multiplied by voltage, from which it is inferable that for a given drive voltage a greater amount of charge can be handled if capacitance is increased. Inasmuch as it is primarily the depth of the depletion region in the semiconductive storage medium which determines the effective capacitance in the interelectrode spaces, it will be seen that decreasing the thickness of the depletion region increases the capacitance. And, finally, of course, it is known that for a given applied voltage, depletion thickness decreases as doping density increases. Operation of the apparatus depicted in FIG. 11 is analogous to that of the structures depicted in the previous figures; and so further description of the operation is considered unnecessary.

Figure 12:
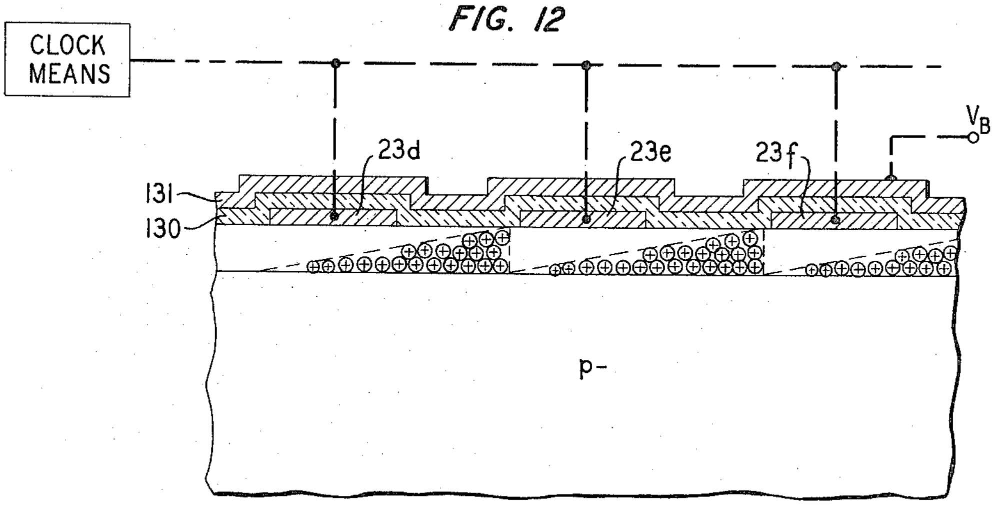
FIG. 12 depicts a somewhat schematic cross-sectional view of a practical variant of previously described apparatus in combination with coatings superimposed over the entire surface to prevent contamination and optionally to enable other modes of operation.

With reference to FIG. 12, and further in accordance with this invention, it is recognized that MIS structures in general are sensitive to any spurious adsorbed charge on the surface thereof. Accordingly, in FIG. 12 there is shown apparatus similar to that depicted in previous figures and more specifically identical to that depicted in FIG. 6, except that there is additionally disposed over the entire surface of the apparatus an additional dielectric layer 130 and an additional metallic coating 131 disposed over the entirety of dielectric 130. Dielectric 130 and metallic coating 131 effectively seal the surface from contamination; and, additionally, if desired, metallic coating 131 may be connected to a source of fixed potential $V_B$ to even more effectively isolate the channel from the effects of spurious charge and/or magnetic fields.

It will be noted in FIG. 12 that CCD field-plate electrodes 23*d*, 23*e*, and 23*f* are shown connected to clock means via phantom lines, rather than solid lines, indicating conduction paths. It will be appreciated that the apparatus of FIG. 12 may be operated with such connections or, alternatively, such connections may be omitted and electrodes 23 may be driven capacitively by applying the clock means to metallic coating 131 in accordance with the capacitive-drive principles disclosed in the copending U.S. Pat. application, Ser. No. 97,518, filed Aug. 4, 1970, now U.S. Pat. No. 3,699,786, issued Oct. 10, 1972, assignee hereof, in which case, of course, it may be advantageous additionally to provide means for isolating the portions of the storage medium underneath the interelectrode spaces from the effects of such capacitive drive.

Figure 13:
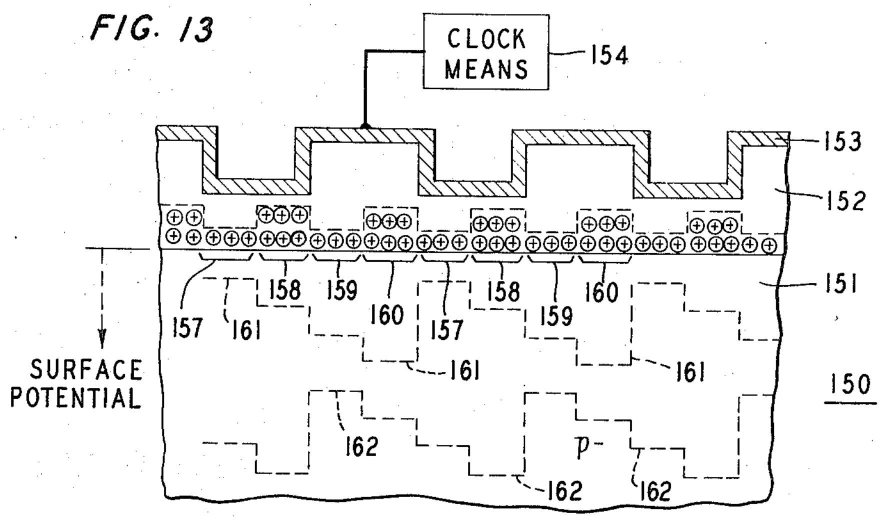
FIG. 13 is a somewhat schematic cross-sectional view taken along the information channel of a portion of charge coupled apparatus in accordance with the instant invention and in which a single metallic coating is disposed over a dielectric of nonuniform thickness and which includes appropriate distributions of immobile charge so as to enable one-phase operation.

With reference now to FIG. 13, there is depicted a somewhat schematic cross-sectional view of a final embodiment of this invention, the view being taken along an intermediate portion 150 of the information channel of charge coupled apparatus in which a single metallic coating is disposed over a dielectric of substantially nonuniform thickness and which includes appropriate distributions of immobile charge so as to enable one-phase operation. As shown, apparatus 150 includes a $P^-$ -type semiconductive storage medium 151, over which there is disposed a dielectric layer 152 of substantially nonuniform thickness and which dielectric layer includes a nonuniform distribution of immobile ionized charge represented by the encircled plus signs. It will be appreciated from the following analysis that the concentrations of such charge can be similar to the concentrations in the previously described embodiments; and, additionally, it will be appreciated that such charge may as well be provided by similarly nonuniform concentrations of dopant impurities adjacent the surface of storage medium 151. Also shown in FIG. 13 is a single metallic coating 153 overlying the entirety of dielectric 152, coating 153 being connected to a clock means capable of providing alternately greater and lesser voltages thereto. Inasmuch as the operation of the apparatus of FIG. 13 is somewhat difficult to describe, reference will first be made to the graphs of FIGS. 14 and 15 to explain the theory inherent in operation of apparatus of the type depicted in FIG. 13.

Figure 14:
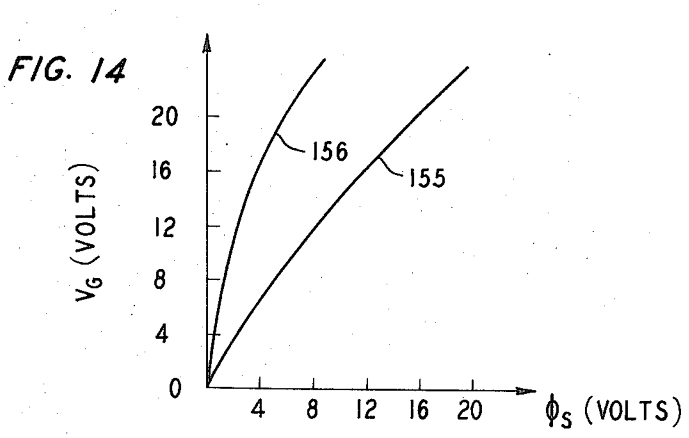
FIG. 14 is a graph depicting surface potential as a function of applied voltage for a generalized MIS structure.

First, in FIG. 14 there is shown a plot of surface potential $\phi_S$ as a function of applied field-plate voltage $V_G$ for a typical metal-insulator-semiconductor (MIS) structure. In FIG. 14, curve 155 represents the situation where very little charge (mobile or immobile) is present between the electrode and the storage medium and where the dielectric thickness is relatively thin, e.g., 1,000 A, in which case it is seen that the surface potential "tracks" with the applied voltage, i.e., is at all points nearly the same as the applied voltage. On the other hand, curve 156 represents the condition in which there also is no charge (mobile or immobile) in either the insulator or in the depletion region of the semiconductor but in which the insulator thickness is substantially thicker, e.g., 5,000 A, than the dielectric for which curve 155 is plotted. It is seen from curves 155 and 156 that for thicker insulator thicknesses the surface potential varies less for a given applied voltage than for thinner insulator thicknesses. For completeness, it should be noted that the particular numbers used in the graph of FIG. 14 would obtain from a one-dimensional analysis of Poisson equation, assuming a background distribution density in a semiconductor of $5\times10^{15}$ donor impurities per cubic centimeter.

It will be appreciated by those in the art that the effect on curves of the type shown in FIG. 14 of introducing mobile or immobile charge either in the insulator or in the depletion region of the semiconductor is to translate the curves either to the left or to the right, i.e., to lesser or greater surface potentials for a given applied voltage, the curves nevertheless retaining their characteristic configurations as a function of applied voltage.

Referring briefly back now to FIG. 13, it is seen that the structure is periodic in four distinct regions, which have been designated 157, 158, 159, and 160. In region 157 the insulator is relatively thin, e.g., 1,000 A, and the density of immobile charge is relatively low, e.g., $5\times10^{11}$ per square centimeter. In region 158 the dielectric thickness is the same as in region 157, but the concentration of immobile charge is greater, e.g. $8\times10^{11}$ per square centimeter. In region 159 the dielectric thickness is substantially greater, e.g., 5,000 A, and the concentration of immobile charge is the same as in region 157, i.e., $5\times10^{11}$ per square centimeter. And, finally, in region 160 the dielectric thickness is the same as in region 159, i.e., 5,000 A, and the concentration of immobile charge is the same as in region 158, i.e., $8\times10^{11}$ per square centimeter.

Figure 15:
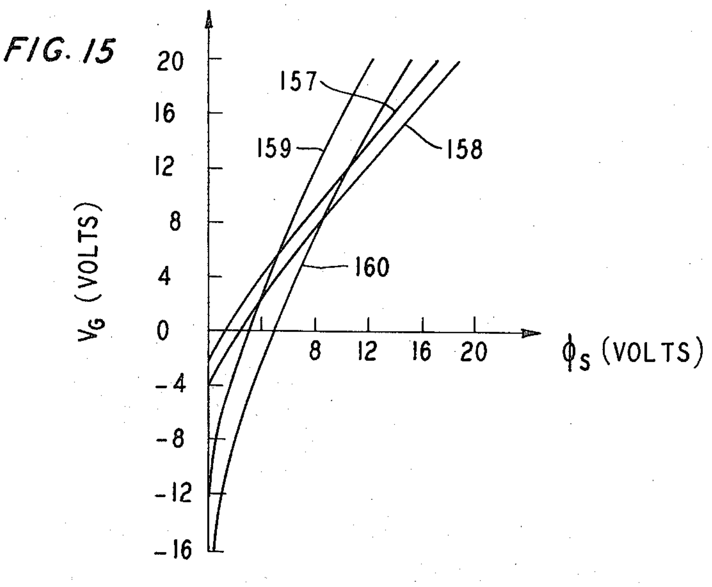
FIG. 15 is a graph depicting surface potential as a function of applied voltage for a specific embodiment of the type depicted in FIG. 13.

Referring now to FIG. 15, there are shown four curves representing the surface potential in a structure of the type shown in FIG. 13, one curve for each of the four separate regions. For clarity, the curves have been given the same reference numerals as the regions which they represent. It is seen in FIG. 15 that for relatively low applied gating voltage, e.g., 1 volt, the surface potential under regions 157 and 158 is less than the surface potential under regions 159 and 160, but that as applied voltage $V_G$ is increased, the relative surface potentials reverse such that at relatively high applied voltage, e.g., $V_G$ equals 16 volts, the surface potential under regions 159 and 160 is now less than the surface potential under regions 157 and 158. The recognition that such reversal takes place in a structure of the type depicted in FIG. 13 is an important element of this form of the invention as it is such reversal which renders the structure of FIG. 13 operative.

Specifically, now, with reference to FIG. 13, broken line 161 represents the surface potential configuration with a first clock voltage, e.g., 1 volt, applied to metallic coating 153. As seen, for each group of regions, 157, 158, 159, and 160, the point of most positive potential occurs under the rightmost portion of the thicker insulator region, i.e., under region 160. Accordingly, any mobile charge introduced into the channel will come to rest in the potential well under the first region 160 to the right of the position of that mobile charge. And it will be further appreciated that, inasmuch as the surface potential under region 159 is somewhat less positive than the surface potential under region 160, region 159 acts as a barrier to charge propagation to the left when the clock voltage is switched to its greater magnitude.

Assuming now that some free electrons are present in the potential well under one of the regions 160, let it be further assumed that the clock voltage is abruptly increased to a more positive value, e.g., 16 volts. In this condition, a surface potential configuration of the type depicted by broken line 162 in FIG. 13 obtains. It is seen that in this latter condition the point of locally most positive potential occurs under regions 158 and that the surface potential of regions 160 now is less positive than the surface potential under regions 157 and 158. Accordingly, any free electrons which were in any of the potential wells 160 now are drawn by the more positive surface potential into the potential wells under regions 158 immediately to the right.

In view of the foregoing extended discussion with respect to FIGS. 13–15, it will be apparent that at each subsequent alternation of the clock voltage, stored charge moves one step, i.e., two regions, to the right and ultimately can be collected at an output and can be detected by any of a variety of means such as previously disclosed, or other means by now well known in the art. Of course, for structures of the type of FIG. 13, maximum differential in dielectric thickness is optimum; and, in practice, a factor of about three is presently believed to be about the minimum tolerable differential thickness for practical operation.

Although the invention has been described in part by making detailed reference to certain specific embodiments, such detail is intended to be, and will be understood to be, instructive rather than restrictive. It will be appreciated by those in the art that many variations not expressly set forth may be made in the structures and modes of operation without departing from the spirit and scope of this invention as disclosed in the teachings contained herein.

For example, throughout this disclosure the electrodes in a given embodient have been illustrated as of substantially uniform size; and, in the one-phase embodiments, the interelectrode spaces have been shown to be about the same size as the electrodes. Of course, such relative uniformity is not essential to this invention but typically will be advantageous so that all storage sites have approximately the same charge storage capability.

Further, it will be apparent that in structures of the type depicted in FIGS. 1, 2, 4, and 5 the nonuniform concentrations of immobile charge may as well be provided by laterally graded distributions of acceptor impurites which introduce immobile negative charge into the structure, in which case, of course, it will be appreciated that the concentration of such impurities must increase in a direction opposite to the desired direction of electron propagation in an N-channel device. The concentration of immobile negative charge is a continuously monotonically varying distribution and, in particular, as previously described, is a continuously monotonically decreasing function.

More generally, when the polarity of the immobile charge is opposite to the polarity of the immobile charge in each of the regions under the electrodes increases in the direction of travel of the mobile charge carriers. On the other hand, when the polarity of the immobile charge is the same as the polarity of the mobile charge carriers the concentration of immobile charge in each of the regions under the electrodes increases in a direction opposite to the direction of travel of the mobile charge carriers. Examples of materials used to form positive immobile charge include phosphorous, arsenic, antimony and, more generally, n-type dopants. Materials used to form negative immobile charge include boron and, more generally, p-type dopants.

Further, it will be appreciated that, although the specific disclosures have been in terms of N-channel devices, primarily because such devices are preferred due to their somewhat greater potential operating speed because of the relatively higher surface mobility of electrons, the principles are equally applicable to P-channel devices. In a P-channel device, of course, the bulk portion of the storage medium would be relatively lighter doped N-type and the mobile charge carries would be holes flowing through an inversion layer.

Still more specifically, to modify the apparatus of FIGS. 2 or 4 for P-channel operation, the lightly doped bulk portion would be N-type and the nonuniform concentration of dopant impurities along the channel would be acceptor impurities with concentration increasing to the right; and, of course, the input and output heavily doped zones, e.g., 44 and 44', would be $P^+$-type.

Still further, of course, it will be appreciated that in those embodiments employing immobile charge in the dielectric layer such charge may as well be negative rather than positive, in which case, for example, in FIG. 3, the concentration of negative immobile charge would increase to the left under each of the electrodes and under each of the interelectrode spaces. And, more generally with respect to structures having immobile charge disposed in the dielectric layer in accordance with this invention, it will be appreciated that such structures may be fabricated by any suitable technique now known or which may subsequently become known in the art. Examples of presently known techniques are: (1) implant ions directly into the dielectric using ion implanation: and (2) implant suitable ions, e.g., potassium or sodium, adjacent the semiconductor-dielectric interface. In this latter techinque, made public at *The International Conference on Ion Implantation in Semiconductors* at Garmish-Partenkirchen, Bavaria, Germany, May 24–May 28, 1971, by W. Fahrner and A. Goetzberger, the ions are found to effect flat band shifts in the semiconductor without the ions acting as conventional dopant impurities in the semiconductor.

And still further in accordance with this invention, it will be appreciated that in any of the above-described embodiments of this invention there may be superimposed upon the linear gradings or approximations thereto localized, more heavily doped zones of immobile charge for providing locally greater potential barriers than are formed by the linear grading. Such a structure may have advantages, for example, in enabling a greater amount of transferable immobile charge to be stored in any given potential well without danger of reverse propagation of reverse charge over the linear barriers provided by the linear grading. And, more specifically, for example, it should be recognized that any of the described structures, e.g., in further modification of the structure of FIG. 6, each particular graded zone of immobile charge can be made to extend under a plurality of successive electrodes and interelectrode spaces and that under each of such electrodes and/or interelectrode spaces there can be superimposed upon the linear grading regions of immobile charge for providing increased charge storage and transfer capability. Examples of such regions of immobile charge which can be superimposed upon the linear grading are regions of the type disclosed, for providing asymmetric potential wells, in the copending U.S. Pat. application, Ser. No. 157,509 filed of even data herewith, and assigned to the assignee hereof.

And, finally, it should be recognized that the principles disclosed herein are directly applicable to the "buried-channel" type of CCD disclosed in the copending U.S. patent application (W. S. Boyle-G. E. Smith Case 18–23), Ser. No. 131,722, filed Apr. 6, 1971, wherein the storage and transfer of mobile carriers takes place inside the bulk of the storage medium rather than at the storage medium-dielectric interface. In such a case, the linearly graded zones of immobile charge or the stepped approximations thereto in accordance with the instant invention would simply be formed to a depth sufficient to produce a similar effect on the buried-channel as they are taught to produce on the surface-channels described in detail hereinabove.

What is claimed is:

1. In charge coupled apparatus of the type adapted for temporary storage and serial transfer in a predetermined direction of varying amounts of mobile charge carriers representing information and wherein the device includes a storage medium having a major surface, an insulating layer disposed over and contiguous with the surface, and a plurality of electrodes disposed over said layer so as to form a path along said predetermined direction, the improvement being that along said path and beneath each electrode there is disposed a laterally continuously monotonically varying distribution of immobile charge in sufficient nonuniformity and quantity such that in operation there is produced under said electrode a substantially asymmetric potential well, the asymmetry in the potential well being such as to produce an electric field along the path in such a direction as to enhance the transfer of the mobile charge carriers in said predetermined direction.

2. In charge coupled apparatus of the type adapted for temporary storage and serial transfer in a predetermined direction of varying amounts of mobile charge carriers representing information and wherein the device includes a storage medium having a major surface, an insulating layer disposed over and contiguous with the surface, and a plurality of electrodes disposed over said layer so as to form a path along which said mobile charge carriers can be transferred in the storage medium in said predetermined direction in response to successively applied voltages, the improvement being that along said path and beneath the electrodes there are disposed a plurality of like regions of immobile charge, in each of which regions the concentration of immobile charge varies continuously and monotonically along said path in a manner sufficient that in operation with one of said voltages applied to each electrode there is produced under substantially all of each electrode along the path a continuously monotonically varying surface potential of sufficient variation that there is produced along the path an electric field sufficient to enhance the transfer of the mobile charge carriers in said predetermined direction.

3. Apparatus as recited in claim 2 wherein the concentration of immobile charge in each of said regions is linearly graded.

4. Apparatus as recited in claim 3 wherein the ions are disposed at least partially in the insulating layer.

5. Apparatus as recited in claim 2 wherein a separate one of said regions of immobile charge is disposed under each of said electrodes.

6. Apparatus as recited in claim 5 further comprising:

a pair of conduction paths, each conduction path being connected to a different one of every second electrode in the succession of electrodes; and two-phase circuit means coupled to said conduction paths for successively biasing the electrodes sufficiently to cause storage and advance of mobile charge carriers representing information.

7. Apparatus as recited in claim 5 wherein separate ones of said regions of immobile charge are substantially coextensive with each of said electrodes.

8. Apparatus as recited in claim 2 wherein the immobile charge is provided by immobile ions.

9. Apparatus as recited in claim 2 wherein the storage medium includes a semiconductor including a bulk portion of relatively high resistivity and the regions are provided by doped surface regions of relatively lower resistivity.

10. Apparatus as recited in claim 9 wherein the bulk portion is of first type semiconductivity and the doped regions are of second type semiconductivity.

11. Apparatus as recited in claim 9 further comprising:

a pair of conduction paths, each conduction path being connected to a different one of every second electrode in the succession of electrodes; and two-phase circuit means coupled to said conduction paths for successively biasing the electrodes sufficiently to cause the storage and advance of mobile charge carriers representing information.

12. Apparatus as recited in claim 11 wherein the minimum voltage supplied by the two-phase circuit means is sufficient to deplete the surface of the semiconductive storage medium to a depth at least as great as the depth to which the dopant impurities of second conductivity type extends into the semiconductive bulk portion.

13. Apparatus as recited in claim 2 wherein:

the space between a pair of successive electrodes is substantially the same as the lateral dimension of each of said electrodes along the path;

one of said regions of immobile charge is disposed under each electrode; and one of said regions of immobile charge is disposed under each of the spaces between the electrodes.

14. Apparatus as recited in claim 13 in combination with:

a conduction path connected to each of said electrodes; and a single-phase circuit means coupled to said conduction path for alternately biasing simultaneously said electrodes to a greater and a lesser voltage.

15. Apparatus as recited in claim 14 wherein said greater voltage is sufficient to produce in said storage medium under each of said electrodes a surface potential greater than the surface potential produced by the regions of immobile charge in the spaces between the electrodes.

16. Apparatus as recited in claim 14 wherein the lesser of said voltages is insufficient to produce in said storage medium a surface potential as great as the surface potential produced by the regions of immobile charge in the spaces between the electrodes.

17. Apparatus as recited in claim 2 wherein each of said regions extends essentially only under one of said electrodes and the space between said one electrode and the next successive electrode.

18. Apparatus as recited in claim 2 wherein each region of immobile charge comprises a zone of said charge in which the concentration of immobile charge increases in the direction of desired charge propagation and extends under a plurality of said electrodes and under a plurality of said spaces between said electrodes.

19. Apparatus as recited in claim 2 wherein:

the polarity of the immobile charge is opposite to the polarity of the mobile charge carriers; and the concentration of immobile charge in each of said regions increases in the predetermined direction.

20. Apparatus as recited in claim 19 wherein each of said regions comprises two distinct parts, in each of which the concentration of immobile charge is substantially uniform; and wherein in the part in the direction of desired charge propagation the concentration of immobile charge is greater than in the other of said parts.

21. Apparatus as recited in claim 2 wherein:

the polarity of the immobile charge is the same as the polarity of the mobile charge carriers; and the concentration of immobile charge in each of said regions increases in a direction opposite to the predetermined direction.

22. Apparatus as recited in claim 21 wherein each of said regions comprises two distinct parts, in each of which the concentration of immobile charge is substantially uniform; and wherein, in the part in the direction opposite the desired direction of charge propagation, the concentration is greater than in the other of said parts.

23. In charge coupled apparatus of the type adapted for temporary storage and serial transfer in a predetermined direction of varying amounts of mobile charge carriers representing information and wherein the device includes a storage medium having a major surface, an insulating layer disposed over and contiguous with the surface, and a plurality of spaced electrodes disposed over said layer so as to form a path along said predetermined direction, the improvement being:

a conduction path connected to each of said electrodes;

a single-phase circuit means coupled to said conduction path for alternately biasing simultaneously said electrodes to a greater voltage and a lesser voltage; and disposed beneath each electrode and beneath each space between adjacent electrodes along said predetermined direction a continuously and monotonically varying distribution of immobile charge such that in response to the single-phase voltages there are produced under each electrode and under each space between adjacent electrodes a substantially asymmetric potential well, the asymmetry in the potential well being such as to produce an electric field along the information channel in such a direction as to enhance the transfer of the mobile charge carriers in said predetermined direction.

24. In charge coupled apparatus of the type adapted for temporary storage and serial transfer in a predetermined direction of varying amounts of mobile charge carriers representing information and wherein the device includes a storage medium having a major surface, an insulating layer disposed over and contiguous with the surface, and a plurality of electrodes disposed over said layer so as to form a path along said predetermined direction, the improvement being:

a plurality of regions of immobile charge under the electrodes for forming under the electrodes asymmetric potential wells, the asymmetry being such that relative to the desired direction of advance of stored mobile charge the leading portion of the well has a greater average depth than the trailing portion of the well;

a plurality of regions of immobile charge disposed between adjacent electrodes for forming in the storage medium under the spaces between adjacent electrodes a potential well having mutual asymmetry with respect to adjacent potential wells formed under adjacent electrodes in response to the successively applied voltages; and a common conduction path connected to each of said electrodes, the asymmetry and mutual asymmetry in said potential wells being sufficient to enable storage and transfer of mobile charge carriers representing information in response to application of single-phase voltages to the electrodes.

25. Apparatus as recited in claim 24 wherein:

the concentration of the immobile charge in each of the regions of the plurality of the regions of immobile charge varies continuously and monotonically along said path.

26. Apparatus as recited in claim 24 wherein the space between a pair of adjacent electrodes is substantially the same as the lateral dimension of each electrode along the path.

27. Charge coupled apparatus of the type adapted for temporary storage and serial transfer in a predetermined direction of varying amounts of mobile charge carriers representing information in response to an applied single-phase voltage source comprising:

a storage medium having a major surface;

an insulating layer disposed over and contiguous with the surface, said layer including a plurality of periodically recurring portions of first and second thicknesses;

a continuous conductive layer forming a path extending along said predetermined direction over a plurality of said periodically recurring layer portions;

under each of said portions a region of nonuniform immobile charge concentration in which the concentration varies along said predetermined direction, said regions of immobile charge being of quantity, concentration variation, and polarity sufficient that, in combination with the insulating layer and conductive layer, storage and sequential transfer of mobile charge carriers is enabled in response to application of single-phase voltage means to the conductive layer.

28. Apparatus as recited in claim 27 further comprising a single-phase clock means coupled thereto for alternately applying first and second voltages to said conductive layer sufficient to cause temporary storage and transfer of mobile charge carries along said predetermined direction.

29. Apparatus as recited in claim 27 wherein the second thickness is at least three times as great as the first thickness.

* * * * *